US011632934B2

(12) United States Patent
Varrasso

(10) Patent No.: US 11,632,934 B2
(45) Date of Patent: Apr. 25, 2023

(54) PET WATERING SYSTEM

(71) Applicant: Sonia Varrasso, Gibsonia, PA (US)

(72) Inventor: Sonia Varrasso, Gibsonia, PA (US)

( * ) Notice: Subject to any disclaimer, the term of this patent is extended or adjusted under 35 U.S.C. 154(b) by 191 days.

(21) Appl. No.: 17/122,751

(22) Filed: Dec. 15, 2020

(65) Prior Publication Data

US 2022/0183254 A1   Jun. 16, 2022

(51) Int. Cl.
*A01K 7/06* (2006.01)
*B05B 17/08* (2006.01)
*G01V 8/00* (2006.01)
*F16L 33/00* (2006.01)

(52) U.S. Cl.
CPC ............... *A01K 7/06* (2013.01); *F16L 33/00* (2013.01); *G01V 8/005* (2013.01)

(58) Field of Classification Search
CPC . A01K 7/00; A01K 7/022; A01K 7/02; A01K 7/06; A01K 39/02; B05B 17/08; B05B 17/085
See application file for complete search history.

(56) References Cited

U.S. PATENT DOCUMENTS

| 4,924,812 | A  | * | 5/1990  | Bernays, Jr. | A01K 7/06 119/76 |
| 6,526,916 | B1 | * | 3/2003  | Perlsweig    | A01K 7/06 239/29.5 |
| 2019/0289819 | A1 | * | 9/2019  | Ranck        | A01K 7/025 |
| 2021/0345582 | A1 | * | 11/2021 | Yoo          | G05D 9/12 |

* cited by examiner

*Primary Examiner* — Kristen C Hayes
(74) *Attorney, Agent, or Firm* — Superior IP, PLLC; Dustin L Call

(57) ABSTRACT

A pet watering system. The pet watering system includes a housing and a waterspout. The waterspout is connected to a water source and is configured to allow water to stream from the water source to the exterior of the housing. The pet watering system also includes a trough, where the trough is configured to receive water that has streamed from the waterspout. The pet watering system further includes a proximity sensor, where the proximity sensor is configured to allow a pet to control the flow of water from the reservoir to the waterspout.

11 Claims, 7 Drawing Sheets

PET WATERING SYSTEM

CROSS-REFERENCE TO RELATED APPLICATIONS

Not applicable.

BACKGROUND OF THE INVENTION

There are a number of pet watering systems in existence. From a simple bowl to more sophisticate systems, they all are basically a dish that holds the water. There are modifications that allow for more water such as tanks or bottles or even attachment to a hose so that water can be supplied whenever the water level falls below a certain amount.

However, these systems suffer from a number of drawbacks. For example, these systems are generally not aesthetically pleasing. That is, they all take the form of a bowl or dish. While they may have various designs or artwork, they are still in the shape of a bowl or dish. Thus, they stand out and are not integrated into their surroundings. I.e., the all are drawbacks aesthetically.

In addition, these systems hold water. This can lead to mildew or growth of pathogens. I.e., the water is not running so it sits and grows mildew, necessitating cleaning of the bowl to prevent illness to the pet. Running water prevents this for humans; however, pets are not able to use a faucet so either a pet system must run continuously or must be operating by humans, both of which have obvious drawbacks.

Therefore, there is a need in the art for a pet watering system that is aesthetically pleasing. In addition, there is a need in the art for a pet watering system that can be operated by the pet.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a pet watering system. The pet watering system includes a housing and a waterspout. The waterspout is connected to a water source and is configured to allow water to stream from the water source to the exterior of the housing. The pet watering system also includes a trough, where the trough is configured to receive water that has streamed from the waterspout. The pet watering system further includes a proximity sensor, where the proximity sensor is configured to allow a pet to control the flow of water from the reservoir to the waterspout.

Another example embodiment includes a pet watering system. The pet watering system includes a housing and a waterspout. The waterspout is connected to a water source and is configured to allow water to stream from the water source to the exterior of the housing. The pet watering system also includes a trough, where the trough is configured to receive water that has streamed from the waterspout and a covering over the trough, where the covering prevents direct access to the waterspout. The pet watering system further includes a proximity sensor, where the proximity sensor is configured to allow a pet to control the flow of water from the reservoir to the waterspout.

Another example embodiment includes a pet watering system. The pet watering system includes a housing. The housing includes one or more attachment points, where the one or more attachment points includes at least one screw hole. The pet watering system also include a screw passing through the at least one screw hole and a surface, attaching the housing to the surface. The pet watering system further includes a waterspout. The waterspout is located within the housing. The pet watering system also includes a water control box. The water control box includes a connector wire. The water control box is connected to a water source at a water inlet and is connected to the waterspout at an outlet pipe. The waterspout is configured to allow water to stream from the water source to the exterior of the housing. The pet watering system also includes a trough, where the trough is configured to receive water that has streamed from the waterspout and a covering over the trough, where the covering prevents direct access to the waterspout. The pet watering system further includes an infrared sensor. The infrared sensor includes a connector wire and is configured to allow a pet to control the flow of water from the water control box to the waterspout. The pet watering system moreover includes a control panel in the water control box. The control panel is configured to receive a signal from the infrared sensor when a pet is detected and open an internal valve after receiving the signal from the infrared sensor.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1A:
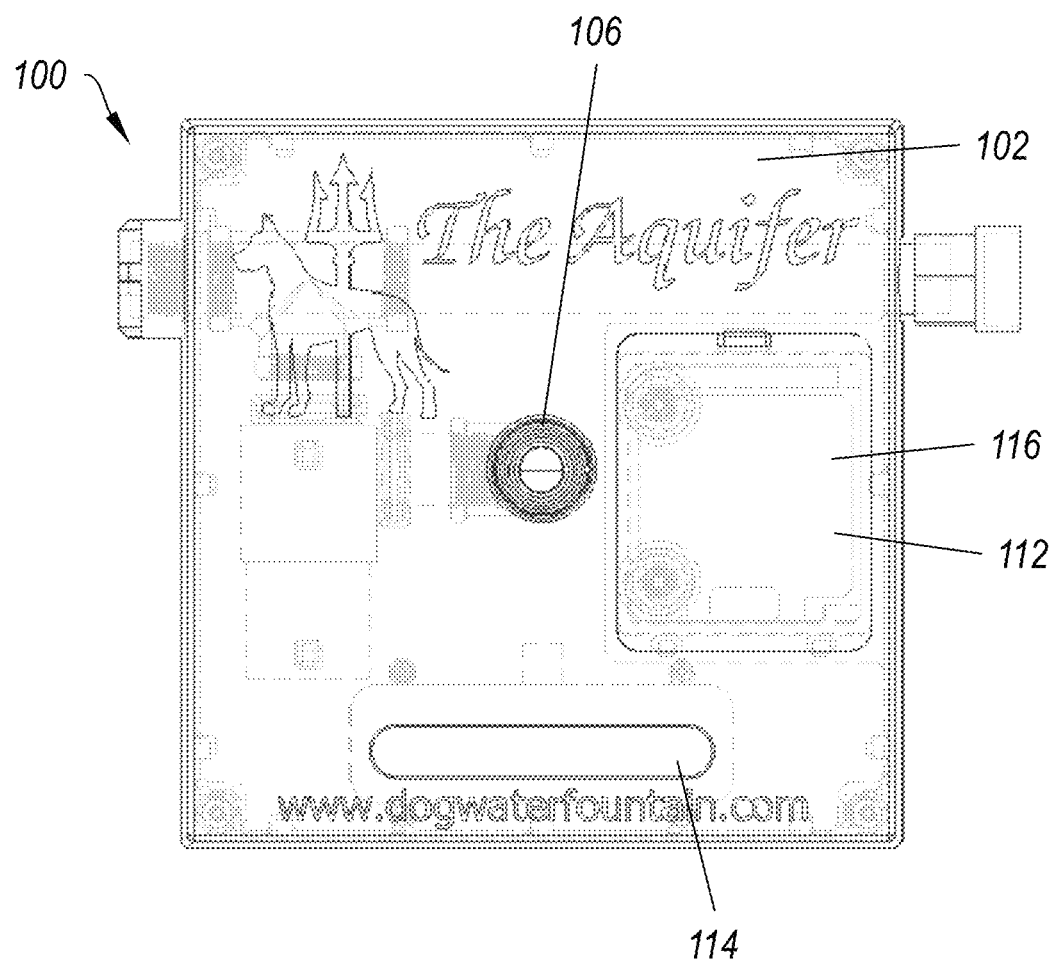
FIG. 1A illustrates a front view of the example of a pet watering system.
Figure 1B:
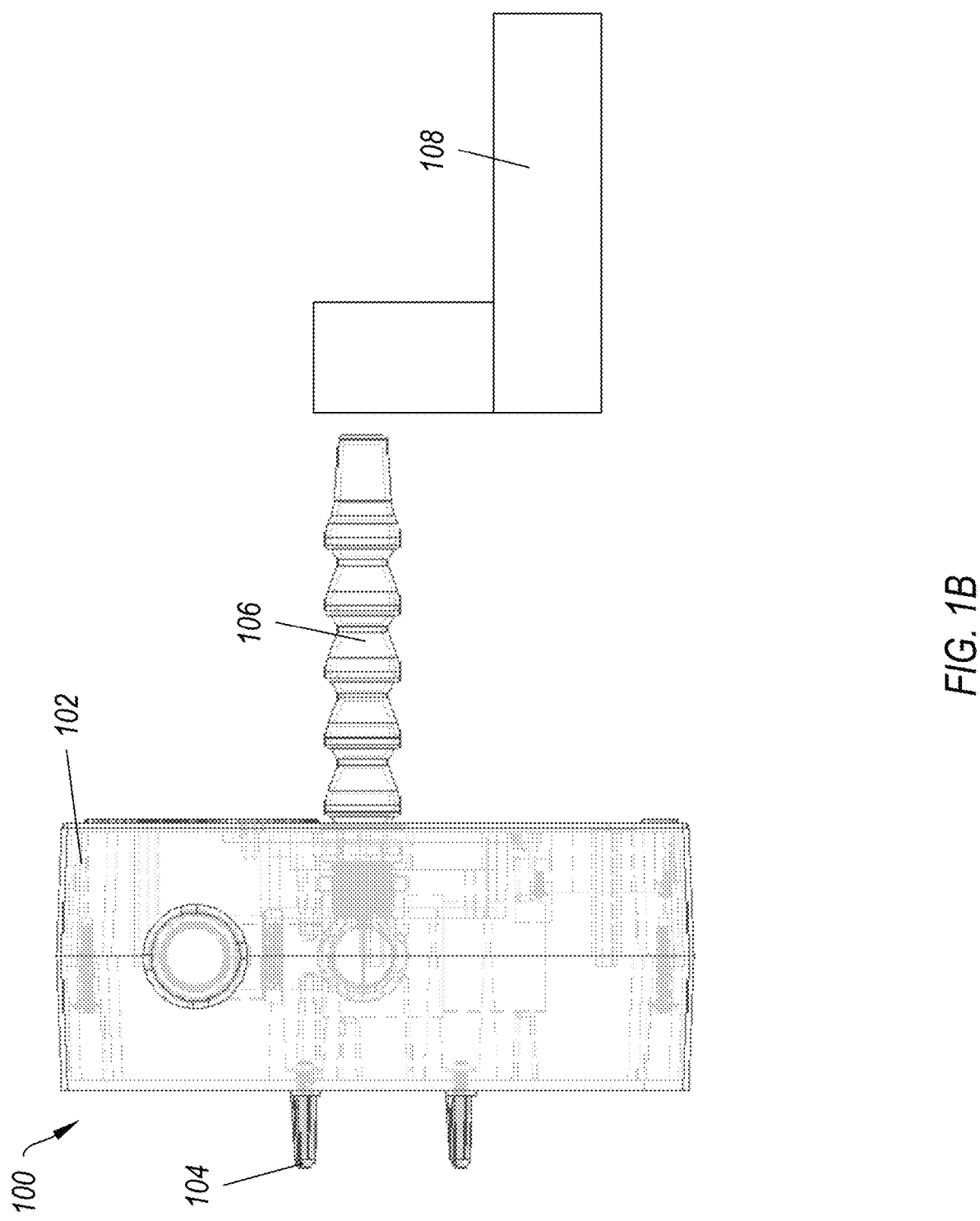
FIG. 1B is a right side view of the example of a pet watering system.
Figure 1C:
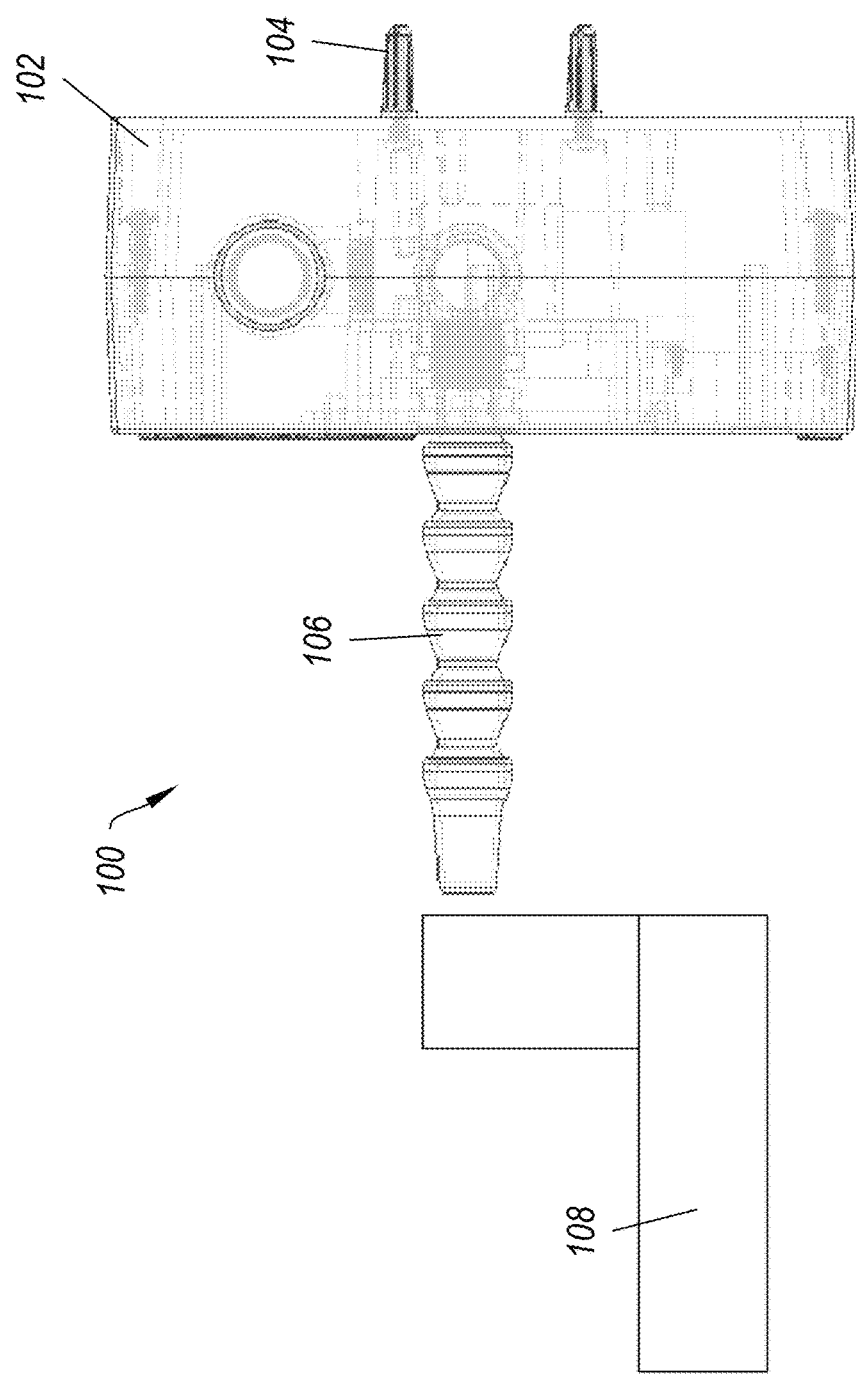
FIG. 1C is a left side view of the example of a pet watering system.
Figure 1D:
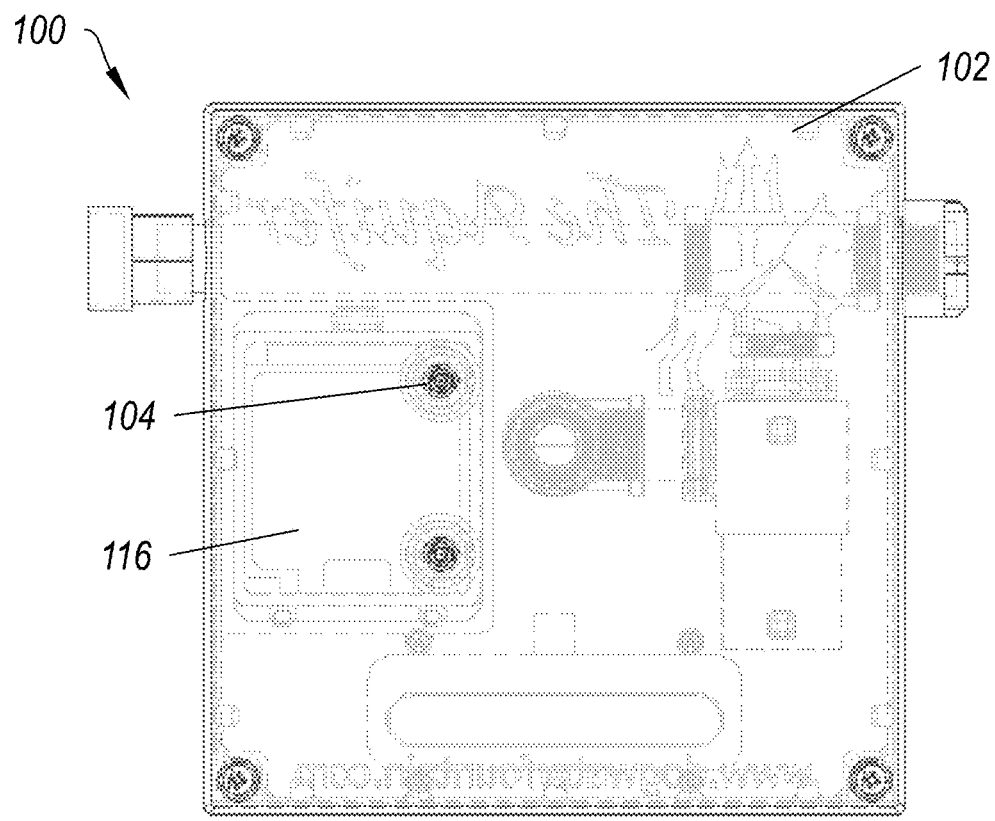
FIG. 1D is a rear view of the example of a pet watering system.
Figure 1E:
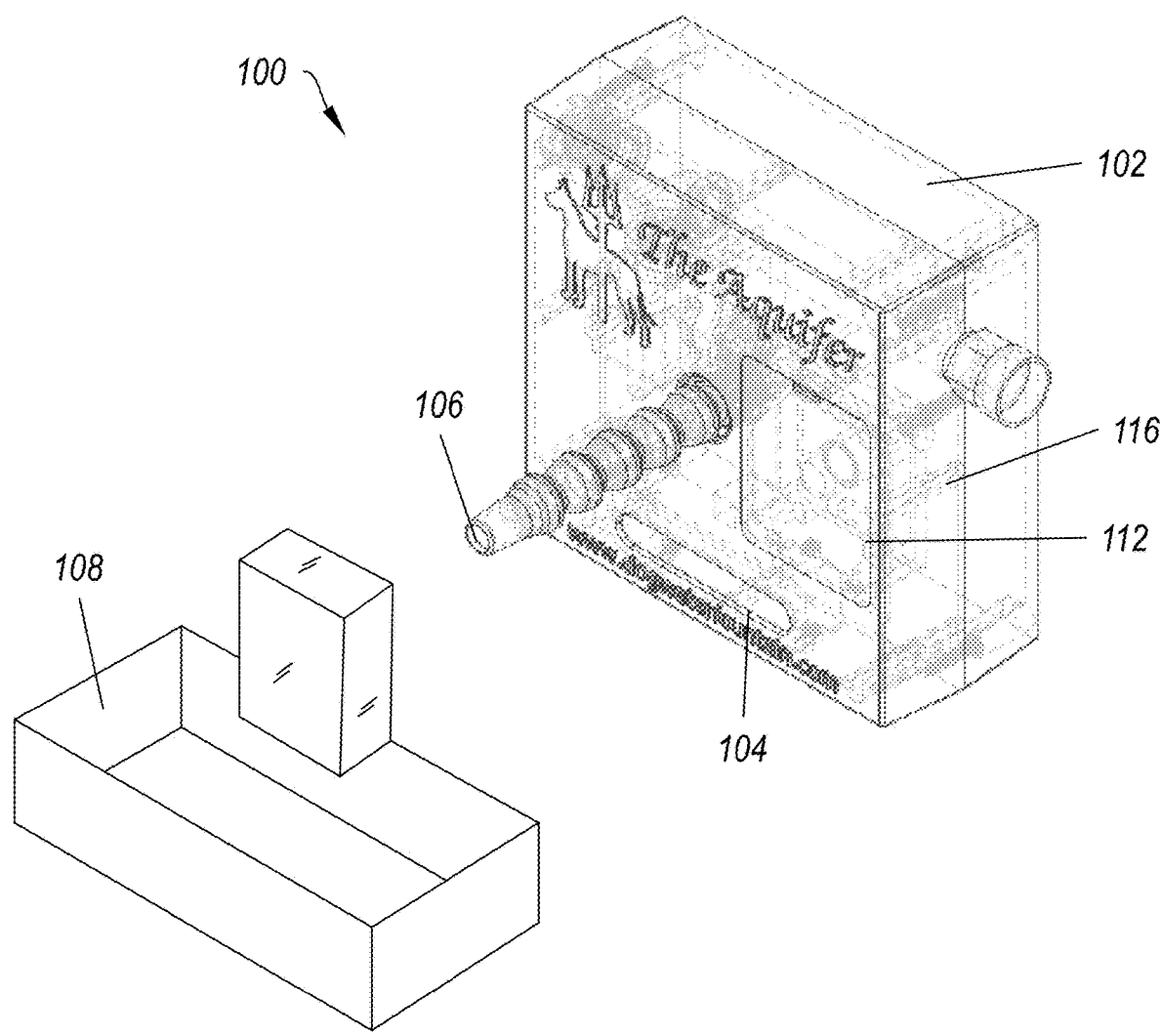
FIG. 1E is a perspective view of the example of a pet watering system.

FIGS. 1A-1E (collectively "FIG. 1") illustrates an example of a pet watering system 100. FIG. 1A illustrates a front view of the example of a pet watering system 100; FIG. 1B is a right side view of the example of a pet watering system 100; FIG. 1C is a left side view of the example of a pet watering system 100; FIG. 1D is a rear view of the example of a pet watering system 100; and FIG. 1E is a perspective view of the example of a pet watering system 100. The pet watering system 100 allows a pet to get water on demand. I.e., the pet is able to control output of the water from the pet watering system 100. The pet watering system 100 connects to a water supply and needs no human intervention to ensure that pets are able to receive water whenever desired.

FIG. 1 shows that the pet watering system 100 can include a housing 102. The housing 102 protects the internal components of the pet watering system 100. I.e., the housing 102 ensures that the components are not accessible unless specifically desired. Additionally or alternatively, the housing 102 is configured to align the other components of the pet watering system 100. I.e., the housing 102 can allow the internal and external components of the pet watering system 100 to be installed with proper spacing maintained among the components. The housing 102 can be constructed of any desired material. For example, the housing 102 can include UV resistant acrylonitrile butadiene styrene (ABS"). As used in the specification and the claims, the phrase "configured to" denotes an actual state of configuration that fundamentally ties recited elements to the physical characteristics of the recited structure. That is, the phrase "configured to" denotes that the element is structurally capable of performing the cited element but need not necessarily be doing so at any given time. Thus, the phrase "configured to" reaches well beyond merely describing functional language or intended use since the phrase actively recites an actual state of configuration.

FIG. 1 also shows that the housing 102 can include one or more attachment points 104. The one or more attachment points 104 allow the pet watering system 100 to be installed in a desired location. For example, the one or more attachment points 104 can include screw holes that allow the pet watering system 100 to be attached to a surface on the interior or exterior of a building.

FIG. 1 further shows that the pet watering system 100 can include a waterspout 106. The waterspout 106 is the location where water is dispensed for the pet. I.e., the waterspout is the location where water is distributed when a pet is determined to be in proximity to the pet watering system 100. The waterspout 106 can be protected so that the pet doesn't have direct access to the waterspout 106, keeping the waterspout 106 clean.

FIG. 1 also shows that the pet watering system 100 can include an access panel 112. The access panel 112 allows for maintenance without removing the housing 102 from its mounting. I.e., the access panel 112 allows a user to access the interior of the housing 102 as desired (e.g., to perform maintenance).

FIG. 1 further shows that the pet watering system 100 can include a proximity sensor 114. The proximity sensor 114 identifies the presence of a pet. I.e., the proximity sensor 114 allows a pet to control the flow of water from the waterspout 106 into the trough 108. In particular, as the pet nears the pet watering system 100, it is detected by proximity sensory 114 and water begins to flow from the waterspout 106 and enters the trough 108, where it can be accessed by the pet. The proximity sensor 114 can include any desired mechanism. For example, the proximity sensor 114 can include a motion sensor, a pressure pad, an infrared sensor, etc.

FIG. 1 additionally shows that the pet watering system 100 can include a water control box 116 (internal). The water control box controls whether water is flowing to the waterspout 106 or is shut off. That is, when a pet is detected by the proximity sensor 114, the water control box 116 allows water to stream from the water source to the waterspout 106. The access panel 112 can allow for immediate access to the water control box 116 if so desired.

Figure 2:
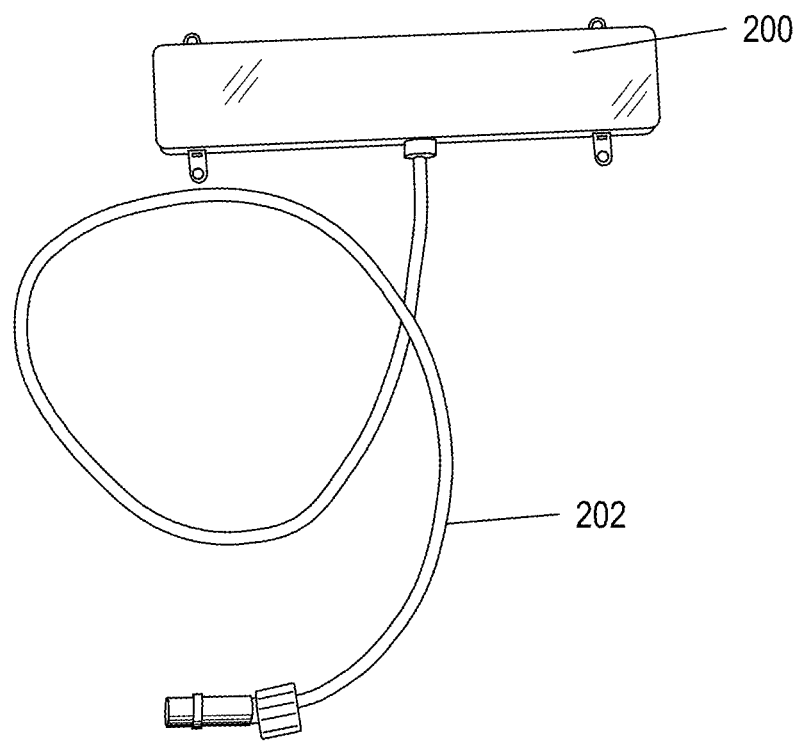
FIG. 2 illustrates an example of an infrared sensor.

FIG. 2 illustrates an example of an infrared sensor 200. The infrared sensor 200 detects the presence of a pet, which will trigger the output of water. That is, no water is output without the infrared sensor 200 triggering water output. Waiting for the presence of a pet reduces waste due to evaporation or loss because of overflow from the trough. Likewise, if water isn't present then the trough stays cleaner (e.g., has less mold or mildew) and, therefore, the water in the trough is cleaner.

FIG. 2 shows that the infrared sensor 200 can include a connector wire 202. The connector wire 202 connects the infrared sensor 200 to a control panel, either in a water control box or external to both the infrared sensor 200 and the water control box. The control panel can trigger the output of water when the presence of a pet is detected. For example, if a pet is within 0-20 cm of the pet watering system as detected by the infrared sensor 200 then water can be released into the trough of the pet watering system.

Likewise, the connector wire 202 is configured to connect the infrared sensor 200 to a power source. The power source can be connected directly to the infrared sensor 200 or can be connected through the control panel. That is, power can be supplied to the control panel, a portion of which is passed to the infrared sensor 200. The power source can include any desired power source, such as a plug or battery.

Figure 3:
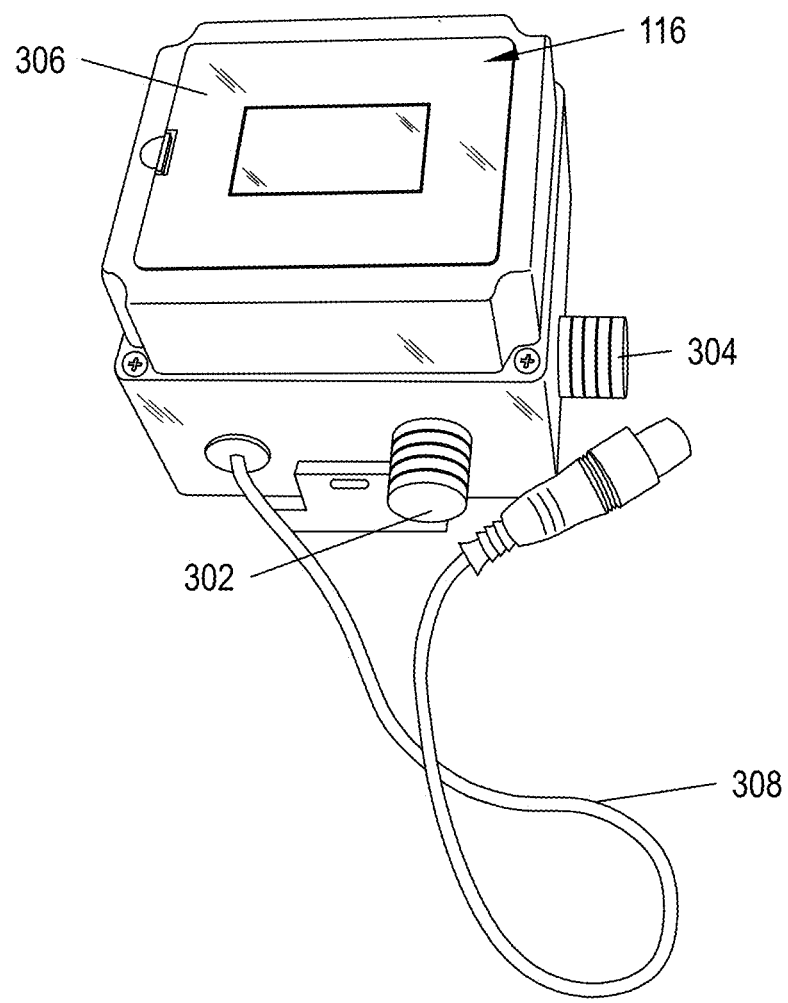
FIG. 3 illustrates an example of a water control box.

FIG. 3 illustrates an example of a water control box 116. The water control box 116 allows water to flow in the presence of a pet. I.e., when a proximity sensor sends an electronic signal signifying the presence of a pet, the water control box 116 opens an internal valve, allowing water to flow and enter the trough where is accessible to the pet. The water control box 116 can include an internal control panel, allowing the water control box 116 to open the internal valve when the presence of a pet is detected.

FIG. 3 shows that the water control box 116 can include an outlet pipe 302. The outlet pipe 302 connects the water control box 116 to the waterspout. That is, the outlet pipe 302 is configured to pass through the water control box 116 to the waterspout. The outlet pipe 302 can include metal, pvc, or any other desired material. The outlet pipe 302 can be connected to the waterspout directly or through an intermediary (e.g., through piping or tubing).

FIG. 3 further show that the water control box 116 can include a water inlet 304. The water inlet 304 can allow the pet watering system 100 to be connected to a water source. Water that flows through the water inlet 304 passes through the outlet pipe 302 to the waterspout. For example, the water inlet 304 can allow the pet watering system 100 to be connected to a hose, hose bib, or other water source. For instance, the water inlet 304 can be structurally the same as a female end of a hose or otherwise include threading that allows for connection to the male end of a hose.

FIG. 3 moreover shows that the water control box 116 can include a power source 306. The power source provides power to the valve within the water control box 116 and/or the attached sensor. For example, the power source 306 can include batteries in a battery compartment. Additionally or alternatively, the power source 306 can include a plug, allowing a user to connect the pet watering system to an outlet.

FIG. 3 additionally shows that the water control box 116 can include a connector wire 308. The connector wire 308 connects the water control box 116 to a proximity sensor. The control panel can trigger the output of water when the presence of a pet is detected. For example, if a pet is detected by a proximity sensor (such as the infrared sensor 200 of FIG. 2) then water can be allowed to pass from the water inlet 304 to the outlet pipe 302.

Additionally or alternatively, if an external control panel is connected, the connector wire 308 can connect the water control box 116 to the control panel. Likewise, the connector wire 308 can configured to connect the water control box 116 to a power source. The power source can be connected directly to the water control box 116 or can be connected through an external control panel. That is, power can be supplied to the control panel, a portion of which is passed to the water control box 116. The power source can include any desired power source, such as a plug or battery.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A pet watering system, the pet watering system comprising:
    a housing, wherein the housing:
        includes one or more attachment points, wherein the one or more attachment points includes at least one screw hole;
    a screw passing through the at least one screw hole and a surface, attaching the housing to the surface;
    a waterspout, wherein the waterspout:
        is located within the housing;
    a water control box, wherein the water control box:
        includes a connector wire;
        is connected to a water source at a water inlet; and
        is connected to the waterspout at an outlet pipe;
    wherein the waterspout is configured to allow water to stream from the water control box to the exterior of the housing;
    a trough, wherein the trough is configured to receive water that has streamed from the waterspout;
    a covering over the trough, wherein the covering prevents direct access to the waterspout; and
    an infrared sensor, wherein the infrared sensor:
        includes a connector wire; and
        is configured to allow a pet to control the flow of water from the water control box to the waterspout; and
    a control panel in the water control box, wherein the control panel is configured to:
        receive a signal from the infrared sensor when a pet is detected; and
        open an internal valve after receiving the signal from the infrared sensor.

2. The pet watering system of claim 1, wherein the infrared sensor includes a motion sensor.

3. The pet watering system of claim 1, wherein the water inlet is configured to connect to a hose.

4. The pet watering system of claim 3, wherein the water inlet includes a female hose connector.

5. The pet watering system of claim 1, wherein the surface is the exterior surface of a building.

6. The pet watering system of claim 1, wherein the surface is an interior wall of a building.

7. The pet watering system of claim 1, further comprising:
    a power source, wherein the power source is configured to provide electrical power to the infrared sensor and the water control box.

8. The pet watering system of claim 7, wherein:
    the power source connects to the control panel; and
    the control panel sends power to the infrared sensor via the connector wire of the infrared sensor.

9. The pet watering system of claim 8, wherein the power source includes a plug.

10. The pet watering system of claim 8, wherein the power source includes a battery.

11. The pet watering system of claim 1, further comprising:
    an access door, wherein the access door allows access to the interior of the housing.

* * * * *